United States Patent
Nakagawa (10) Patent No.: US 7,360,569 B2
(45) Date of Patent: Apr. 22, 2008

(54) PNEUMATIC TIRE WITH TREAD INCLUDING CIRCUMFERENTIAL RIB REGION, BLOCK REGIONS AND SIPES

(75) Inventor: Yoshiki Nakagawa, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 281 days.

(21) Appl. No.: 11/000,205

(22) Filed: Dec. 1, 2004

(65) Prior Publication Data
US 2005/0121123 A1    Jun. 9, 2005

(30) Foreign Application Priority Data
Dec. 9, 2003    (JP) .............................. 2003-410762

(51) Int. Cl.
B60C 11/03    (2006.01)
B60C 11/12    (2006.01)

(52) U.S. Cl. ............................ 152/209.9; 152/209.26; 152/209.27; 152/DIG. 3

(58) Field of Classification Search ............ 152/209.8, 152/209.9, 209.18, 209.26, 209.27, DIG. 3; D12/518
See application file for complete search history.

(56) References Cited

U.S. PATENT DOCUMENTS

| | | | | |
|---|---|---|---|---|
| 4,785,863 A | * | 11/1988 | Tsuda et al. ............. | 152/209.8 |
| 5,358,021 A | * | 10/1994 | Takasugi et al. ......... | 152/209.8 |
| 6,439,286 B1 | * | 8/2002 | Baumhofer et al. ...... | 152/209.8 |
| D483,319 S | * | 12/2003 | Abe .......................... | D12/518 |
| 6,715,522 B1 | * | 4/2004 | Wada .................... | 152/209.18 |
| 6,796,350 B1 | * | 9/2004 | Gerresheim et al. ..... | 152/209.9 |
| 2002/0139460 A1 | * | 10/2002 | Boiocchi et al. ......... | 152/209.8 |
| 2003/0121580 A1 | * | 7/2003 | Bello et al. ............. | 152/209.18 |
| 2005/0269004 A1 | * | 12/2005 | Miyabe et al. ........... | 152/209.9 |

FOREIGN PATENT DOCUMENTS

EP    0 338 491 A2    10/1989

(Continued)

*Primary Examiner*—Steven D. Maki
(74) *Attorney, Agent, or Firm*—Birch, Stewart, Kolasch & Birch, LLP (57) ABSTRACT

It is a subject to improve wet performances and noise performances while restricting degradations in dry performances, and for solving this subject, the pneumatic tire is comprised of a tread grounding surface that is partitioned into four to five regions by three to four main grooves that extend successively in the tire circumferential direction. The main grooves are comprised of one large width main groove which groove width comprises 4 to 20% of a tread grounding width and which is apart from the tire equator by a distance corresponding to 5 to 30% of the tread grounding width further to one grounding end side, and small width main grooves that are disposed between the large width main groove and the other grounding end and which groove width is larger than 2.0 mm but smaller than that of the large width main groove. Both groove side edges of the large width main groove extends in a successive and linear manner in the tire circumferential direction without being interrupted. A ratio ST/SY between a front and rear rigidity ST of the tread grounding surface and a lateral rigidity SY is set to be larger than 0.9 but smaller than 1.1. The lateral rigidity SYs is set to be larger than the front and rear rigidity STs for the shoulder block regions $4s1$, $4s2$ on both sides. As for the central block region (when the number of main grooves is three, crown block regions $4c1$, $4c2$, and when the number of main grooves is four, the circumferential rib region $4c2$), the lateral rigidity SYc is smaller than the front and rear rigidity STe.

4 Claims, 8 Drawing Sheets

FOREIGN PATENT DOCUMENTS

| | | | |
|---|---|---|---|
| EP | 686516 | * | 12/1995 |
| EP | 718124 | * | 6/1996 |
| EP | 1002666 | * | 5/2000 |
| JP | 1-195103 | * | 8/1989 |
| JP | 5-330313 A | | 12/1993 |
| JP | 2000-185526 A | | 7/2000 |
| JP | 2003-170709 | * | 6/2003 |
| JP | 2003-285610 | * | 10/2003 |
| JP | 2003-285610 A | | 10/2003 |
| JP | 2003-326917 | | 11/2003 |

* cited by examiner

PNEUMATIC TIRE WITH TREAD INCLUDING CIRCUMFERENTIAL RIB REGION, BLOCK REGIONS AND SIPES

BACKGROUND OF THE INVENTION

1. Field of the Invention

The present invention relates to a pneumatic tire in which wet performances and noise performances have been improved while restricting degradations in steering stability on dry road surfaces (dry performances).

2. Description of the Prior Art

In pneumatic tires for use in passenger cars or the like, tread grounding surfaces are generally provided with main grooves extending successively in a tire peripheral direction, wherein wet performances are improved by increasing groove capacities of such main grooves so as to shift velocities at which hydroplaning and others occur to a higher speed region.

However, when the groove capacities of the main grooves are set to be large, drawbacks are presented in that large air column resonance is generated through air passing through air column tubes formed by the main grooves and the road surface when running on a dry road surface, and in that noises inside and outside of vehicles are increased. In this manner, there exists a contradictory relationship between wet performances and tire noise so that it is strongly being wanted for tires in which both features are improved.

The applicant of the present invention has thus suggested in Japanese Patent Laid-Open Publication No. 2003-285610 to form main grooves of large width at positions separate from a tire equator by specified distance and to make both groove side edges of the large width main grooves succeed in a linear manner in the tire peripheral direction without being interrupted by lateral grooves or sipings. In such a tire, it is possible to improve the wet performances by setting the main grooves to be of large width. Further, since both side edges of the main grooves are linearly successive, air column resonance will be hardly excited. Moreover, since the main grooves are formed at portions at which they are exposed to low grounding pressure, effects such as improving the noise performances such as restricting air column resonance low can be exhibited.

However, since the main grooves of large width are provided at non-symmetric positions in such a tire, the grounding balance may be affected which may bring on the fear that the dry performances are degraded. Particularly in case sipings are formed for securing steering stability (on-snow performances) on snowy road surfaces, further degradations in dry performances are worried owing to decreases in pattern rigidity.

SUMMARY OF THE INVENTION

The present invention aims to provide a pneumatic tire, which is an improvement of the above-mentioned Japanese Patent Laid-Open Publication No. 2003-330997, in which wet performances and noise performances have been improved while restricting degradations in dry performance.

For achieving the above object, the present application is a pneumatic tire provided with three or four main grooves on a tread grounding surface that extend in a successive manner in a tire peripheral direction, wherein the main grooves are comprised of one large width main groove, the groove width thereof being in the range of 4 to 20% of a tread grounding width and the groove center thereof being spaced from a tire equator by a distance of 5 to 30% of the tread grounding width to one grounding end side in an tire axial direction, and small width grooves that are disposed between the large width main groove and the other grounding end, the groove width thereof being larger than 2.0 mm but smaller than that of the large width main groove, and wherein both groove side edges of the large width main groove extend in a successive and linear manner in the tire circumferential direction without being interrupted by lateral grooves, sipings, slots or other notches, and wherein a ratio ST/SY between an front and rear rigidity ST of the tread grounding surface in the tire circumferential direction on average of a single round of the tire and a lateral rigidity SY in the tire axial direction is set to be larger than 0.9 but smaller than 1.1.

When the number of main grooves is three, the tread grounding surface is partitioned into a first shoulder block region between the large width main groove and the one grounding end, a first crown block region between the large width main groove and a first small width main groove that adjoins the large width main groove on the other grounding end side, a second crown block region between the first small width main groove and a second small width main groove adjoining the first small width main groove on the other grounding end side, and a second shoulder block region between the second small width main groove and the other grounding end.

The first shoulder block region and the second shoulder block region are arranged in that the lateral rigidity SYs is set to be larger than the front and rear rigidity STs while the first crown block region and the second crown block region are arranged in that the lateral rigidity SYc is set to be smaller than the front and rear rigidity STc.

When the number of main grooves is four, the tread grounding surface is partitioned into a first shoulder block region between the large width main groove and the one grounding end, A first crown block region between the large width main groove and a first small width main groove that adjoins the large width main groove, A second circumferential rib region between the first small width main groove and a second small width main groove adjoining the first small width main groove on the other groundling end side, a third crown block region between the second small width main groove and a third small width main groove adjoining the second small width main groove on the other grounding end side, and a second shoulder block region between the third small width main groove and the other grounding end.

The first shoulder block region and the second shoulder block region are arranged in that the lateral rigidity SYs is set to be larger than the front and rear rigidity STs while the second circumferential rib region is arranged in that the lateral rigidity SYc is set to be smaller than the front and rear rigidity STe.

In the present descriptions, the term "tread grounding surface" denotes a region of the tread surface that is grounded when the tire is assembled to a normal rim and a normal load is applied to the tire of a normal internal pressure condition in which it is filled with normal internal pressure. The term "tread grounding width" denotes a width between grounding ends in the tire axial direction that comprise outer ends of the tread grounding surface.

Further, the term "normal rim" denotes a rim with standards being defined for each tire within standardizing systems including standards on which the tires are based, such concretely being an ordinary rim according to JATMA, a "design rim" according to TRA and a "measuring rim" according to ETRTO. The term "normal internal pressure" denotes an air pressure that is defined by the standards for each of the tires, and while it denotes a maximum air pressure according to JATMA, a maximum value as recited in the table of "tire load limits at various cold inflation pressures" according to TRA, and "inflation pressure" according to ETRTO, it is defined as 180 kPa for use in tires of passenger cars. The term "normal load" denotes a load that is defined by the standards for each of the tires, wherein it denotes a maximum load performance according to JATMA, a maximum value as recited in the table of "tire load limits at various cold inflation pressures" according to TRA, and load obtained by multiplying 0.88 to the "load capacity" according to ETRTO.

In this respect, unless stated otherwise, dimensions of respective portions of the tire are values obtained with the tires being in the normal internal pressure condition in which no load is applied thereto, and the groove width is a value measured at the tread surface orthogonal to the groove center.

Due to the above-described arrangement of the present invention, it is possible to simultaneously improve both the wet performances and noise performances while restricting degradations dry performances.

DESCRIPTION OF THE PREFERRED EMBODIMENTS

Embodiments of the present invention will now be explained together with illustrated examples thereof.

Figure 1:
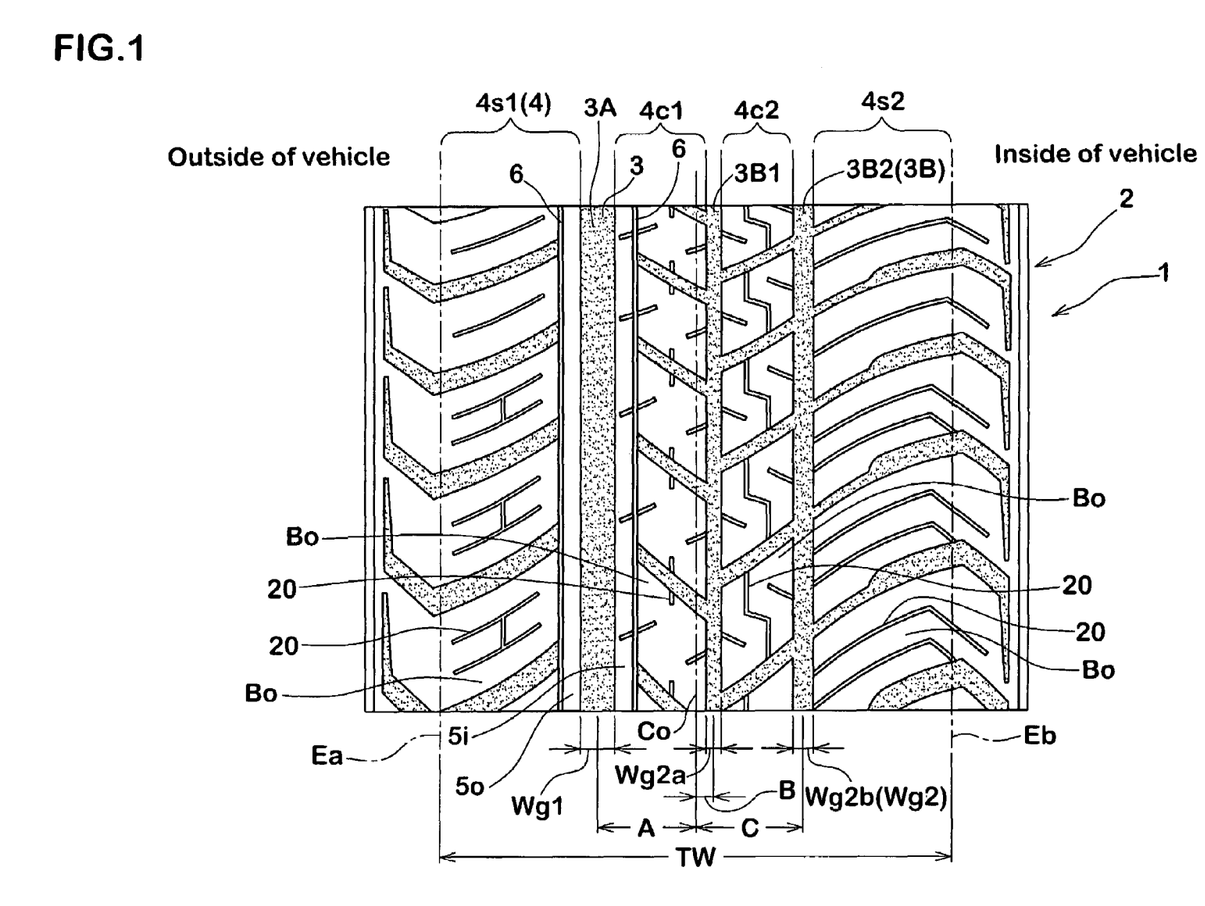
FIG. 1 is an exploded view illustrating a tread surface of a pneumatic tire according to a first embodiment of the present invention.
Figure 2:
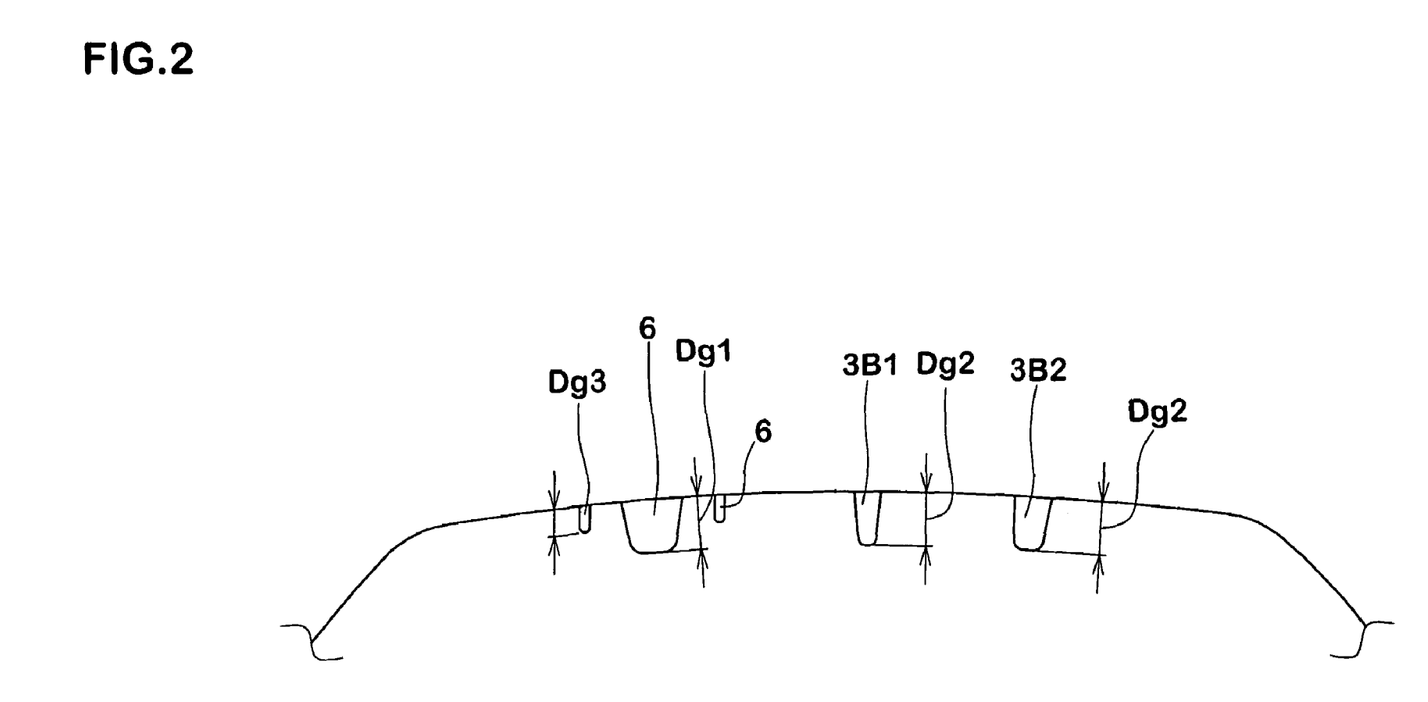
FIG. 2 is a diagram schematically illustrating a contour configuration of the tread surface in a normal internal pressure condition.

FIG. 1 is an exploded view illustrating a tread surface in an exploded view when the pneumatic tire of the present invention is a tire for use in passenger cars, and FIG. 2 is a diagram schematically showing a contour configuration of the tread surface in a normal internal pressure condition.

In FIGS. 1 and 2, the pneumatic tire 1 comprises, on a tread grounding surface 2 thereof, three or four main grooves 3 successively extending in the tire peripheral direction whereby a non-symmetric pattern comprised of four or five block regions 4 partitioned by the main grooves 3 are formed on the tread grounding surface 2. In the present example, when the tire 1 is mounted, it is mounted such that one ground end Ea in the tire axial direction (left-hand side in FIG. 1) becomes outside of the vehicle while the other grounding end Eb becomes inside of the vehicle.

The main grooves 3 are comprised of one large width main groove width 3A, the groove width Wg1 thereof being in the range of 4 to 20% of a tread grounding width TW, and remaining two to three small width main grooves 3B, the groove width Wg2 thereof being larger than 2.0 mm but smaller than that of the large width main groove 3A. While respective groove depths Dg1, Dg2 of the large width main groove 3A and the small width main grooves 3B are not particularly limited, it is preferable to set them in a range of 6.0 to 9.0 mm, and further of 6.5 to 8.5 mm in case of tires for use in passenger cars. From among the main grooves 3, at least the large width main groove 3A is comprised of a straight groove that extends linearly along the tire peripheral direction (while all main grooves 3 actually do in the present embodiment). With this arrangement, the drainage efficiency is improved when compared to, for instance, zigzag-type grooves so that larger drainage effects can be secured with minimum groove widths.

According to the present invention, the large width main groove 3A which is of largest width is formed with displaced from the tire equator Co to the one grounding end Ea side while a distance A of a groove center of the large width main groove 3A from the tire equator Co is set in the range of 5 to 30% of the tread grounding width TW.

This is because the drainage effects of a tread half portion outside of the vehicle, at which grounding properties at the time of performing turning movements are strongly required, can be improved by disposing the large width main groove 3A on the grounding end Ea side. As a result, a velocity at which hydroplaning occurs at the time of performing turning movements, which is the most important factor for wet running safety, can be shifted to a higher velocity region (the turning hydroplaning performance can be improved) so that the wet performances can be more effectively improved.

Accordingly, when the distance A becomes less than 5% of the tread grounding width TW or exceeds 30% thereof, the large width main groove 3A will not function effectively, and the grounding properties of the tread half portion outside of the vehicle at the time of performing wet running cannot be sufficiently improved. Accordingly, effects of improving the turning hydroplaning performances cannot be sufficiently exhibited. Moreover, when the distance A is less than 5%, the grounding pressure at the large width main groove 3A when performing straight-ahead running will be increased which results in a large air column resonance from the large width main groove 3A so that it becomes difficult to sufficiently enjoy effects of improving the noise performance. When the distance A exceeds 30%, the large width main groove 3A will excessively come closer to the grounding end Ea side so that senses of rigidity at the time of performing turning movements can hardly be obtained so that the turning properties when performing dry running tend to be harmed. Accordingly, a lower limit value for the distance A is preferably not less than 10% and further not less than 15% of the tread grounding width TW while an upper limit value thereof is preferably not more than 27% and further not more than 25% of the tread grounding width TW.

When the groove width Wg1 of the large width main groove 3A is less than 4% of the tread grounding width TW, the draining effects of the large width main groove 3A itself will be insufficient so that effects of improving turning hydroplaning performances cannot be sufficiently exhibited. On the other hand, when it exceeds 20%, the pattern rigidity and rigidity balance will be worsened so that the steering stability tends to be harmed. Accordingly, a lower limit value for the groove width Wg1 is preferably not less than 6% and further not less than 8% of the tread grounding width TW while an upper limit value is preferably not more than 15% and further not more than 12% of the tread grounding width TW.

A first embodiment (FIG. 1) in which three main grooves 3 are provided, and a second embodiment (FIG. 8) in which four main grooves 3 are provided will be taken as examples and will be explained in order.

The main grooves 3 of the first embodiment are comprised of the large width main groove 3A, a first small width main groove 3B1 that adjoins the large width main groove 3A on the other grounding end Eb side, and a second small width main groove 3B2 adjoining the first small width main groove 3B1 on the other grounding end Eb side. With this arrangement, the tread grounding surface 2 is partitioned into four block regions 4, namely a first shoulder block region 4s1 between the large width main groove 3A and the one grounding end Ea, a first crown block region 4c1 between the large width main groove 3A and the first small width main groove 3B1, a second crown block region 4c2 between the first small width main groove 3B1 and the second small width main groove 3B2, and a second shoulder block region 4s2 between the second small width main groove 3B2 and the other grounding end Eb.

In this respect, the term "block region 4" denotes are region including blocks B0 partitioned by the main grooves 3, lateral grooves in directions intersected with the main grooves 3, and pattern grooves such as sipings.

Figure 3:
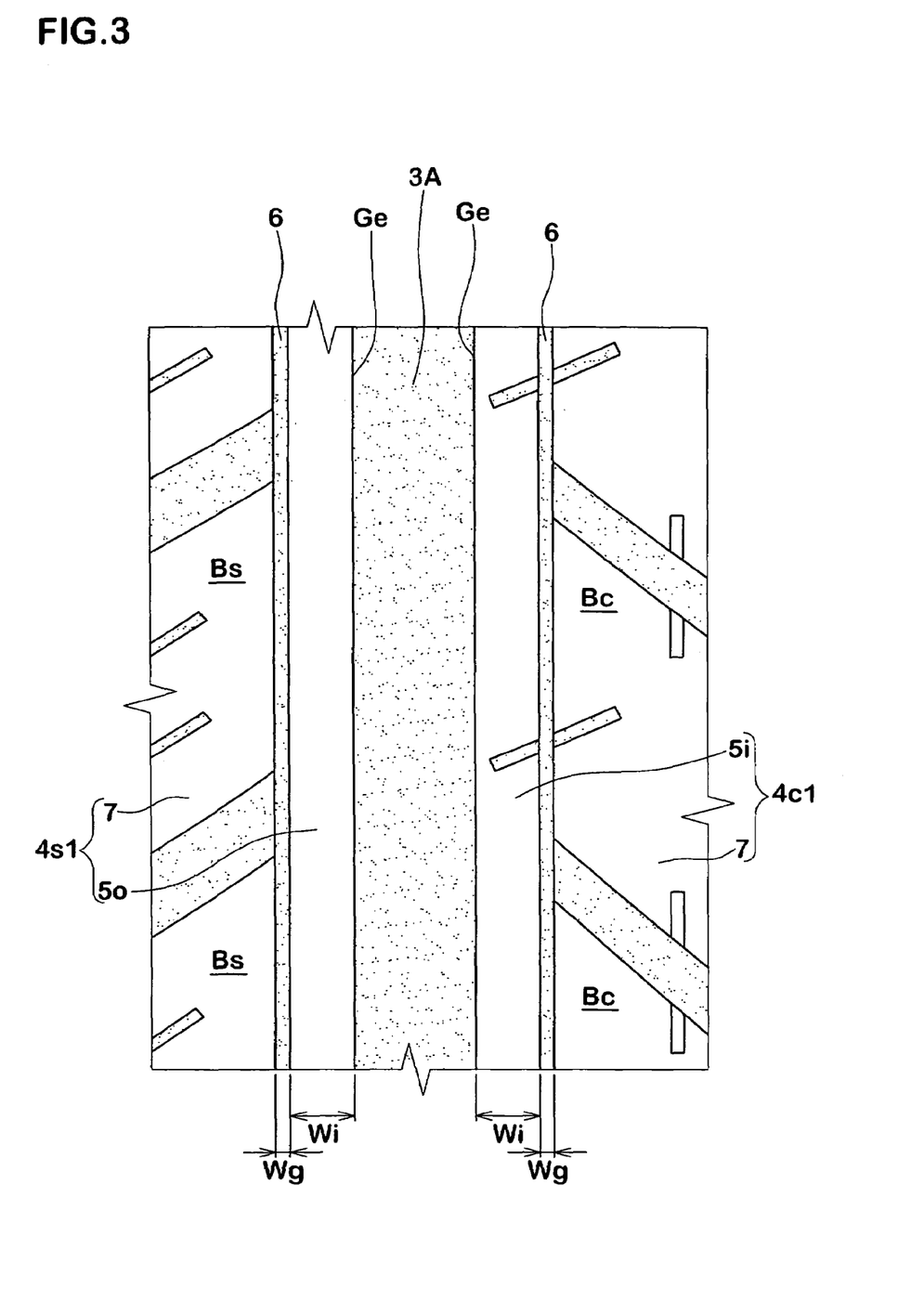
FIG. 3 is a plan view illustrating a large width main groove in enlarged form together with rib portions.

The large width main groove 3A is arranged in that both groove side edges Ge, Ge thereof extend in a successive and linear manner in the tire peripheral direction without being interrupted by lateral grooves, sipings, slots or other notches. As illustrated in FIG. 3 in enlarged form, such groove side edges Ge can be formed by respectively providing an inner rib portion 5i on the tire equator side that extends successively without being interrupted in the tire peripheral direction and an outer rib portion 5o on the grounding end Ea side on both sides of the large width main groove 3A to adjoin the same.

In this respect, linear narrow grooves 6 (including sipings) having a groove width Wg of 0.4 to 2.0 mm adjoin the inner and outer rib portions 5i, 5o on sides opposite of the large width main groove 3A. While a groove depth Dg3 of the narrow grooves 6 is not particularly limited, it is desirably set to 10 to 85% and preferably approximately 15 to 60% of a groove depth Dg1 of the large width main groove 3A, wherein it is not desirable that it exceeds 85% since the rib rigidity of the rib portions 5i, 5o tends to be degraded.

In the present embodiment, the first shoulder block region 4s1 is partitioned, through the narrow groove 6 in the tire peripheral direction, into main portions 7 that are comprised of rows of shoulder blocks Bs and that face along the grounding end Ea, and the outer rib portion 5o that faces along the large width main groove 3A. The first crown block region 4c1 is partitioned, through the narrow groove 6, into the inner rib portion 5i that faces along the large width main groove 3A and main portions 7 that are comprised of rows of center blocks Bc and that face along the first small width main groove 3B1. Here, when the inner and outer rib portions 5i, 5o extend successively without being interrupted in the tire peripheral direction, it is possible to form lateral grooves, sipings or the like of closed type which one ends are interrupted within the ribs 5i, 5o without opening to the groove side edges Ge. The present embodiment illustrates a case in which closed-type sipings are formed at the inner rib portion 5i.

Figure 4A:
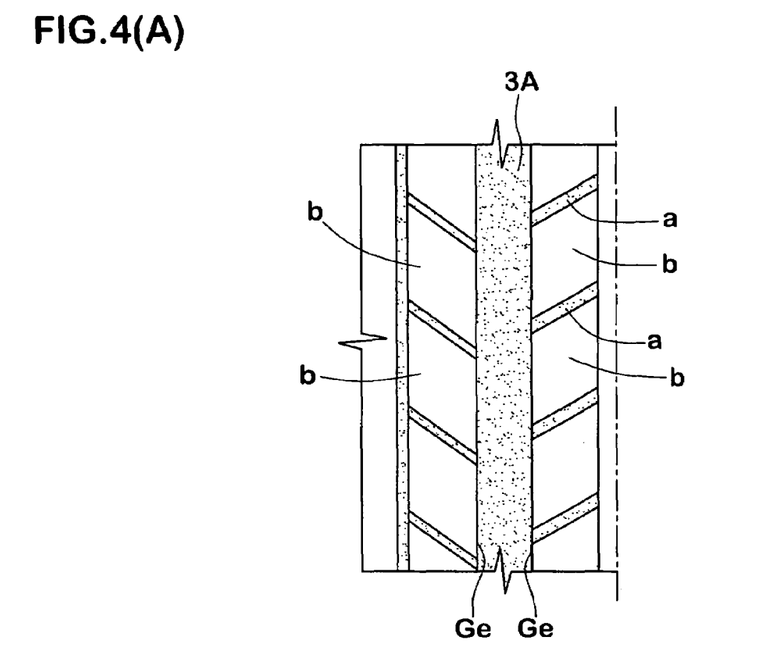
FIGS. 4(A) and 4(B) are plan views illustrating actions and effects achieved by the large width main groove and the rib portions.
Figure 4B:
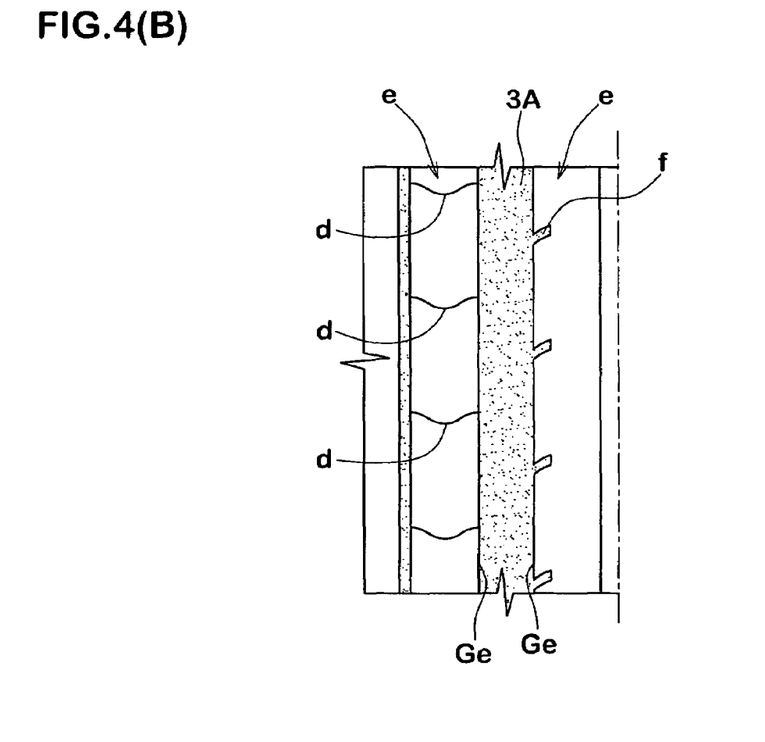

The inventors of the present invention have found out through experiments that when rows of blocks b partitioned by lateral grooves (a) are provided on at least one side of the large width main groove 3A as illustrated in FIG. 4(A), the blocks (b) will oscillate through repetition of grounding/ungrounding on the road surface during running while pumping of the lateral grooves (a) is generated. It has also been found that this, in turn, will oscillate air passing through the large width main groove 3A and that air column resonance within the large width main groove 3A is induced. As illustrated in FIG. 4(B), when non-continuous ribs (e) that are interrupted by sipings (d) in the peripheral direction are provided on at least one side of the large width main groove 3A, or when ribs (e) themselves are successive in the peripheral direction, and when groove side edges Ge of the large width main groove 3A are not successive in a linear manner through slots f or other notches, there still be a tendency that air column resonance is induced owing to oscillation of the ribs (e) or disturbance of air flow owing to sipings (d), slots or notches (f) even though some improvements are found when compared to the case of FIG. 4(A), and worsening of the noise performances cannot be avoided.

In contrast thereto, in the present invention, rib portions 5i, 5o of high rigidity that extend successively in the tire circumferential direction are provided on both sides of the large width main groove 3A while groove side edges Ge are further formed in a linearly successive manner in the circumferential direction without being interrupted. With this arrangement, it is possible to restrict oscillation of the rib portions 5i, 5o when performing running, and origins of disturbances in airflow are eliminated. It is accordingly possible effectively restrict occurrence of air column resonance from occurring at the large width main groove 3A also when achieving improvements in wet performances by securing a large groove capacity by the large width main groove 3A, and pass-by noise can be reduced to an even lower level. Moreover, the large width main groove 3A is disposed at a position spaced from the tire equator Co by the distance A. Accordingly, the grounding pressure at the large width main groove 3A is reduced, and deformation and oscillation of the rib portions 5i, 5o is also reduced. This also contributes to restriction of air column resonance.

In this respect, while the present embodiment illustrates a case in which the narrow grooves 6 are linear and in which rib widths Wi, Wo of the inner and outer rib portions 5i, 5o (as illustrated in FIG. 3) are constant, the narrow grooves 6 may also be formed in a zigzag-like manner depending on needs. While not particularly limited, the rib widths Wi, Wo are preferably in a range of 2 to 6% of the tread grounding width TW and further 4 to 6%, wherein when this value falls below 2%, a reduction in rib rigidity will be caused so that the rib portions 5i, 5o tend to oscillate which will lead to degradations in effects of restricting air column resonance. On the other hand, when it exceeds 6%, the rib rigidity will become excessively large which is unfavorable since envelope effects or riding comfort tend to be harmed or noise performances of low frequency are apt to be badly affected.

More preferably, the rib width Wo of the outer rib portion 5o shall be set to be larger than the rib width Wi of the inner rib portion 5i. In this case, the rib width Wo on the grounding end Ea side (outside of the vehicle) onto which large grounding pressure is applied when performing turning movements will become large. As a result, it will be possible to more effectively prevent worsening of the steering stability without provoking degradations in wear resistance or grip force at the time of performing turning movements. More particularly, a ratio of the rib width (Wo/Wi) is set to 1.05 to 1.40 and further to 1.1 to 1.3. In this respect, when the narrow grooves 6 are of zigzag-like shape, the rib widths Wi, Wo correspond to average values of maximum values and minimum values of the rib-widths formed by the zigzags.

Figure 5:
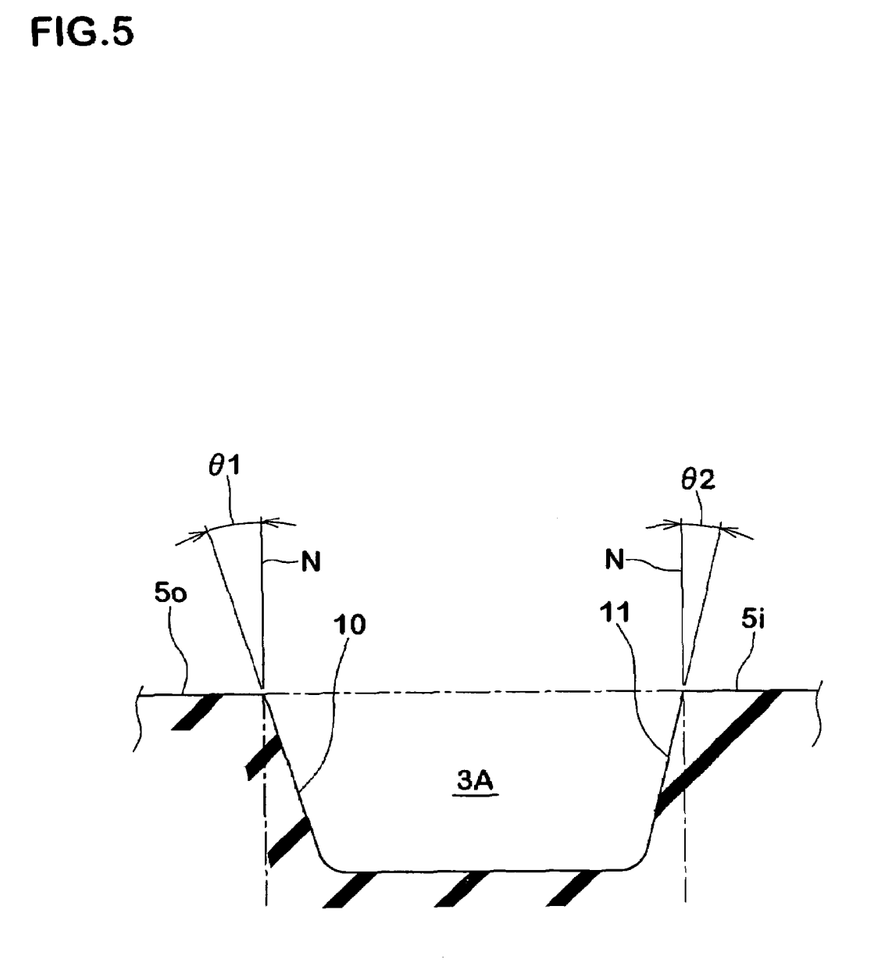
FIG. 5 is a sectional view showing a groove wall of the large width main groove.

As illustrated in FIG. 5, the present embodiment is arranged in that an inclination angle θ1 of a groove wall 10 of the large width main groove 3A on the grounding end Ea side is set to be larger than an inclination angle θ2 of a groove wall 11 thereof on the tire equator Co side. Such inclinations of the groove walls serve to relatively improve the rigidity of the outer rib portion 5o, which bears much of the grounding pressure when performing turning, with respect to that of the inner rib portion 5i. As a result, this serves to improve the steering stability and to improve the wear resistance on the outer rib portion 5o side. In this respect, the inclination angles θ1, θ2 are inclination angles with respect to a normal line N of the tread grounding surface 2, wherein the present embodiment illustrates a case in which θ1 is set to 12° and θ2 to 10°. Though not particularly limited, since the rigidity balance of the rib tends to be harmed even when the difference between inclination angles of the groove walls (θ1−θ2) is too large, the difference is desirably set to around 2 to 5°.

As illustrated in FIG. 1, the first small width main groove 3B1 is formed such that its groove center is located in vicinity of the tire equator, in the present embodiment, at a position located from the tire equator Co to the other grounding end Eb side by a distance B corresponding to 1 to 5% of the tread grounding width TW. The first small width main groove 3B1 serves to improve drainage effects in vicinity of the tire equator at which the grounding pressure becomes high when performing straight-ahead running. When the distance B exceeds 5% of the tread grounding width TW, drainage effects in vicinity of the tire equator will be reduced so that the wet performances at the time of performing straight-ahead running tend to be harmed. When it is smaller than 1% or it is displaced closer to the grounding end Ea side than the tire equator Co, the rigidity of the first crown block region 4c1 will be excessively small.

The second small width main groove 3B2 is formed at a position that is substantially symmetric to the large width main groove 3A with a distance C of its groove center from the tire equator Co being in a range of 80 to 120% of the above distance A. With this arrangement, the drainage when performing straight-ahead running is balanced over the entire tread grounding surface 2 for securing wet performances when performing straight-ahead running. For this purpose, a groove width Wg2b of the second small width main groove 3B2 is preferably set to be larger than a groove width Wg2a of the first small width main groove 3B1, and further to 1.1 to 1.5 times of the groove width Wg2a. In this respect, the groove widths Wg2a, Wg2b are more preferably in a range of 2 to 7% of the tread grounding width TW, respectively.

Next, since the tire 1 is arranged, as described above, to have a non-symmetric pattern in which one large width main groove 3A is displaced to outside of the vehicle, the grounding balance tends to be harmed which may lead to degradations in dry performances. Thus, for improving dry performances, the tire of the present invention is arranged in that (1) a ratio ST/SY between an front and rear rigidity ST of the tread grounding surface 2 in the tire circumferential direction on average of a single round of the tire and a lateral rigidity SY in the tire axial direction is set to be larger than 0.9 but smaller than 1.1, and (2) the first and second shoulder block regions 4s1, 4s2 are arranged in that the lateral rigidity SYs is set to be larger than the front and rear rigidity STs while the first and second crown block regions 4c1, 4c2 are arranged in that the lateral rigidity SYc is set to be smaller than the front and rear rigidity STc.

For securing stability when performing straight-ahead running, it will be necessary for a tire to improve the rigidity of a tread center side in the circumferential direction at which the grounding pressure when performing straight-ahead running becomes large. Accordingly, the crown block regions 4c1, 4c2 are respectively arranged in that the front and rear rigidity STc of the respective block regions is set to be larger than the lateral rigidity SYc of the respective block regions (STc>SYc). Further, for stability when performing turning movements, it will be necessary to improve the lateral rigidity on the tread shoulder side at which the grounding pressure when performing turning movements becomes large for securing high cornering power. Accordingly, the shoulder block regions 4s1, 4s2 are respectively arranged in that the lateral rigidity SYs of the respective block regions is set to be larger than the front and rear rigidity STs (SYs>STs) of the respective block regions. With this arrangement, it will be possible to improve the steering stability of both, straight-ahead running and turning movements on dry road surfaces (dry performances).

At this time, for maintaining the rigidity balance of the entire tread grounding surface 2, the ratio ST/SY between the front and rear rigidity ST and the lateral rigidity SY of the grounding surface needs to be set in a range that it is larger than 0.9 but smaller than 1.1. When this value comes off this range, the rigidity balance is harmed so that the dry performances cannot be improved.

In this respect, the rigidity ratio SYc/STc of the crown block regions 4c1, 4c2 is preferably set to not less than 0.65 while the rigidity ratio STs/SYs of the shoulder block regions. 4s1, 4s2 is preferably set to not less than 0.65, wherein when both values become smaller than 0.65, respectively, the rigidity difference will become excessively large to lead to a tendency in that the dry performances and wear performances are badly affected.

Figure 6A:
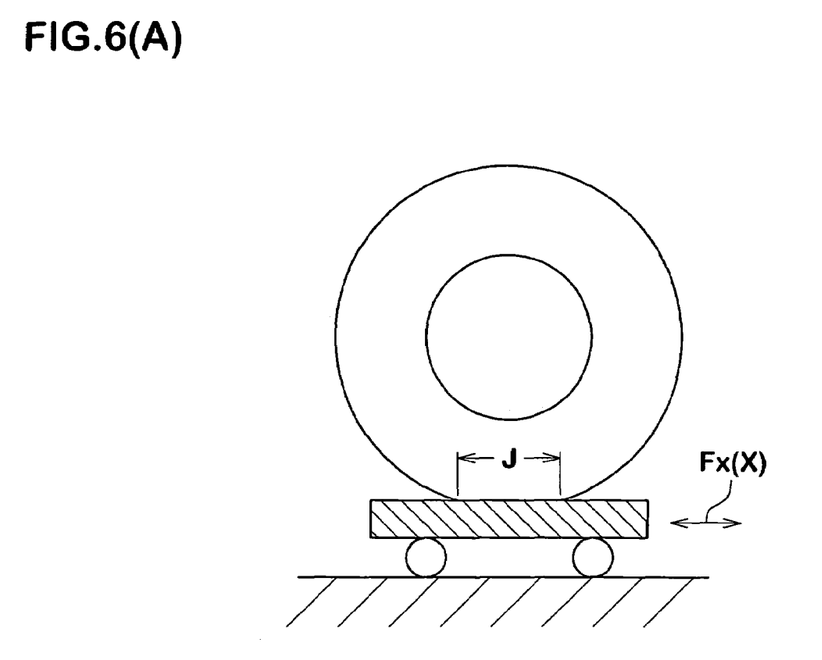
FIGS. 6(A) and 6(B) are diagrams for explaining front and rear rigidity and lateral rigidity of a grounding surface.

Note that the "front and rear rigidity ST" is measured in the following manner. As illustrated in FIG. 6(A), a tire of normal internal pressure condition that has been assembled to a normal rim and which is filled with normal internal pressure is applied with normal load and is grounded on a flat road surface. In the grounded condition, the front and rear rigidity ST is obtained as a ratio Fx/X between front and rear force Fx and an amount of movement X when the tire is relatively moved in front and rear directions on the flat road surface. At this time, the ratio Fx/X is obtained at a plurality of measuring positions extending over the entire round of a tire, and an average value thereof is defined as the "front and rear rigidity ST". In this respect, the plurality of measuring positions is set at pitches in the circumferential direction that is not more than a grounding length J.

Figure 6B:
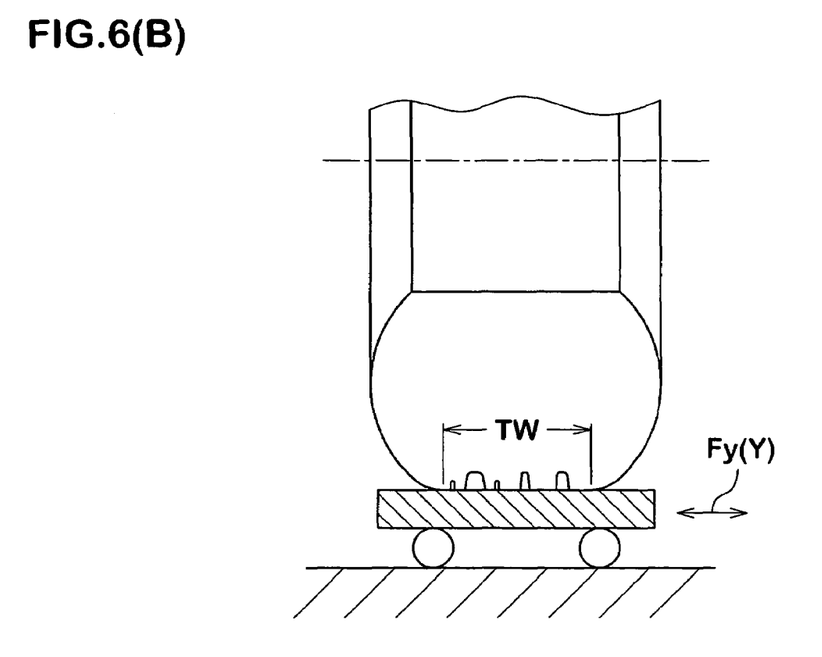

The "lateral rigidity SY" is measured in the following manner. As illustrated in FIG. 6(B), in a similar grounded condition to the above, the lateral rigidity SY is obtained as a ratio Fy/Y between lateral force Fy and an amount of movement Y when the tire is relatively moved in lateral directions (tire axial directions) on the flat road surface. At this time, the ratio Fy/Y is obtained at a plurality of measuring positions extending over the entire round of a tire, and an average value thereof is defined as the "lateral rigidity SY". In this respect, the plurality of measuring positions is set at pitches in the circumferential direction that is not more than the grounding length J.

Figure 7A:
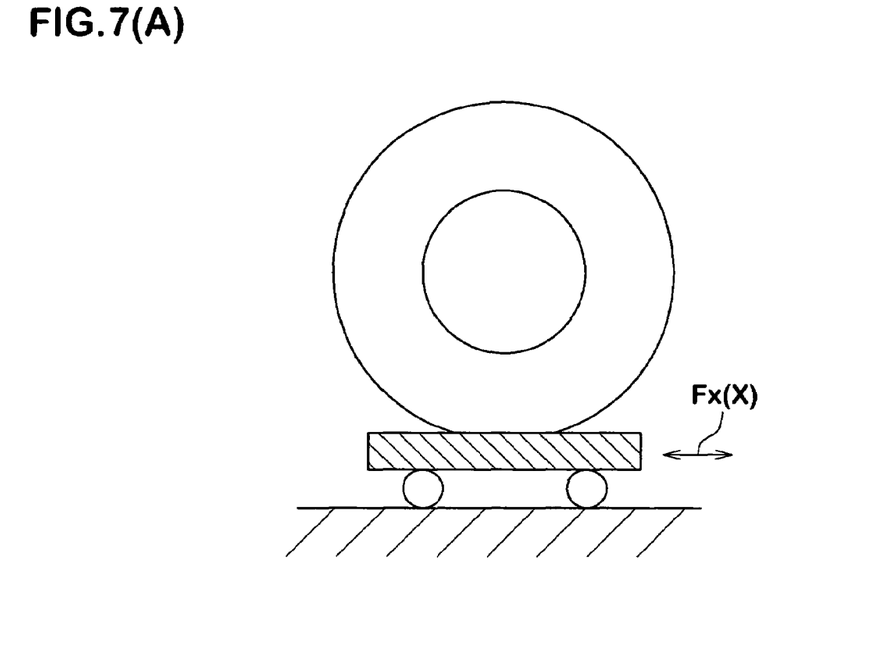
FIGS. 7(A) and 7(B) are diagrams for explaining front and rear rigidity and lateral rigidity of a block region.
Figure 7B:
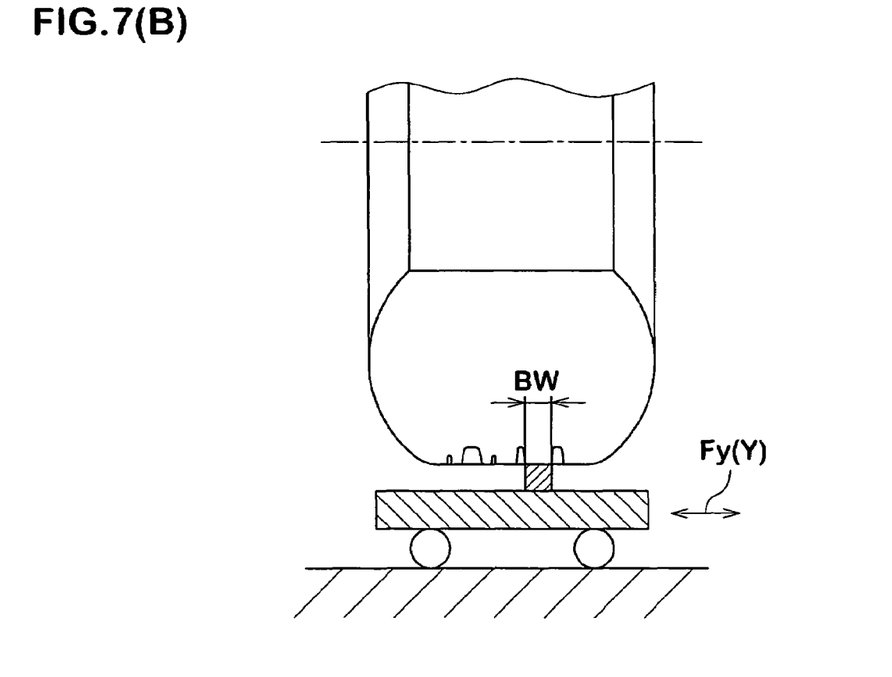

The front and rear rigidity and the lateral rigidity of the block regions 4 are measured in the following manner. As illustrated in FIGS. 7(A) and 7(B), only a block region 4 that comprises the object of measurement of the tire in the normal internal pressure condition is grounded by using a flat road surface having a width BW of the block region 4. In this respect, the grounding load is a value obtained by multiplying a value of ratio BW/TW to the normal load. The ratio Fx/X between front and rear force Fx and the amount of movement X and the ratio Fy/Y between the lateral force Fy and the amount of movement Y when the tire is relatively moved in front and rear directions and lateral directions on the flat road surface are obtained as front and rear rigidity and the lateral rigidity, respectively. In this respect, the ratio Fx/X and the ratio Fy/Y are obtained at a plurality of measuring positions extending over the entire round of a tire, and average values thereof are defined as the front and rear rigidity and the lateral rigidity. The plurality of measuring positions is set at pitches in the circumferential direction that is not more than the grounding length J.

Next, sipings 20 are formed on blocks B0 of the respective block regions 4 for securing steering stability on snowy road surfaces (on-snow performances). However, when the number or length of such sipings 20 formed is increased, it may be that the pattern rigidity is degraded and the effects of improving dry performances cannot be effectively exhibited.

Accordingly, for securing a high on-snow performances while restricting degradations in dry performances, the present embodiment restricts an edge component length LE in the tire axial direction (lateral direction) of all edges including edges of the sipings 20 and edges of the blocks B0 of the respective block regions 4 in the following manner. More particularly, where an edge component length of the second shoulder block region 4s2 is defined as LEs2, an edge component length of the second crown block region 4c2 as LEc2, and an edge component length of the first crown block region 4c1 as LEc1, this edge component length is set to satisfy LEs2>LEc2≧LEc1 and more preferably

LEs2>LEc2>LEc1.

In this manner, by sequentially reducing the edge component lengths LE in lateral directions from inside to outside of the vehicle between the other grounding end Eb and the large width main groove 3A, it is possible to restrict degradations in dry performances. This is because degradations in rigidity are restricted low by making the edge component length LE in lateral directions shorter, the higher the rigidity required for the block region 4 in question, since the grounding pressure at the time of running becomes large. In this respect, a ratio LEs2/LEc1 between a maximum and a minimum of the edge component lengths LE in lateral direction is preferably 1.5 to 3.5 and further 2.0 to 3.0.

In this respect, the term "edge component length in lateral directions LE" is defined for all edges disposed in the block regions 4 (including edges of the sipings 20 and edges comprising outer peripheries of the blocks B0) as a total sum of component lengths when the edges are projected to a tire axial directional line.

Figure 8:
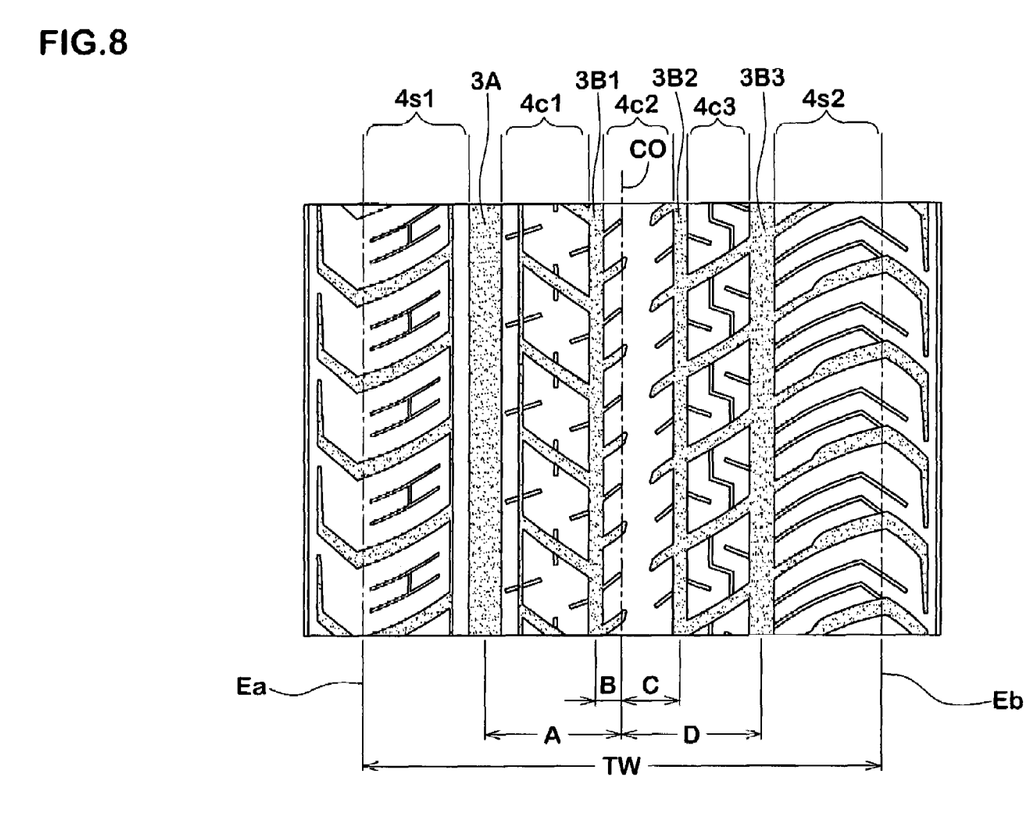
FIG. 8 is an exploded view illustrating a tread surface of a pneumatic tire according to a second embodiment of the present invention.

The second embodiment in which four main grooves 3 are provided as illustrated in FIG. 8 will now explained.

The maingrooves 3 of the second embodiment are comprised of the large width main groove 3A, a first small width main groove 3B1 that adjoins the large width main groove 3A on the other grounding end Eb side, a second small width main groove 3B2 adjoining the first small width main groove 3B1 on the other grounding end Eb side, and a third small width main groove 3B3 adjoining the second small width main groove 3B2 on the other grounding end Eb side. With this arrangement, the tread grounding surface 2 is partitioned into five block regions 4, namely a first shoulder block region 4s1 between the large width main groove 3A and the one grounding end Ea, a first crown block region 4c1 between the large width main groove 3A and the first small width main groove 3B1, a second circumferential rib region 4c2 between the first small width main groove 3B1. and the second small width main groove 3B2, a third crown block region 4c3 between the second small width main groove 3B2 and the third small width main groove 3B3, and a second shoulder block region 4s2 between the third small width main groove 3B3 and the other grounding end Eb.

The second embodiment differs from the first embodiment in that the lateral rigidity SYs is set to be larger than the front and rear rigidity STs in the first and second shoulder block regions 4s1, 4s2, respectively, while the lateral rigidity SYc is set to be smaller than the front and rear rigidity STc in the second circumferential rib region 4c2.

With this arrangement, it is possible to secure stability at the time of performing straight-ahead running, to improve cornering power and to improve the steering stability at both, straight-ahead running and turning movements on dry road surfaces (dry performances). Particularly in view of improving the dry performance, it is desirable to set the lateral rigidity SYc to be smaller than the front and rear rigidity STc also for the first and third crown block regions 4c1, 4c3, respectively.

In this respect, the first small width main groove 3B1 is formed with displaced from the tire equator Co further to the one grounding end Ea side while the second width main groove 3B2 is formed with displaced from the tire equator Co further to the other grounding end Eb side. At this time, the distance C of the groove center of the second small width main groove 3B2 from the tire equator Co is preferably in a range of 2 to 15% of the tread grounding width TW while the distance D of the groove center of the third small width main groove 3B3 from the tire equator Co is preferably in a range of 80 to 120% of the distance A of the groove center of the large width main groove 3A from the tire equator Co. With this arrangement, the drainage of straight-ahead running is balanced over the entire read grounding surface 2 for securing wet performances when performing straight-ahead running.

Further, a groove width Wg2c of the third small width main groove 3B3 is preferably set to be larger than the groove widths Wg2a, Wg2b of the first and second small width main grooves 3B1, 3B2 and further to be 1.1 to 1.5 times larger than the groove widths Wg2a, Wg2b. In this respect, the groove widths Wg2a, Wg2b and Wg2c are further preferably in a range of 2 to 7% of the tread grounding width TW, respectively.

In the second embodiment, for securing high on-snow performances while restricting degradations in dry performances, where an edge component length of the second shoulder block region $4s2$ is defined as LEs2, an edge component length of the third crown block region $4c3$ as LEc3, an edge component length of the second circumferential rib region $4c2$ as LEc2, and an edge component length of the first crown block region $4c1$ as LEc1, this edge component length is set to satisfy LEs2≧LEc3≧LEc2≧LEc1 and more preferably
LEs2>LEc3>LEc2>LEc1.

In this manner, similar to the first embodiment, by sequentially reducing the edge component lengths LE in lateral directions from inside to outside of the vehicle between the other grounding end Eb and the large width main groove 3A, it is possible to restrict degradations in dry performances while securing high on-snow performances. In this respect, a ratio LEs2/LEc1 between a maximum and a minimum of the edge component lengths LE in lateral direction is preferably 1.5 to 3.5 and further 2.0 to 3.0.

While particularly preferred embodiments of the present invention have been described in details, the present invention is not to be limited to the illustrated embodiment alone but may be embodied upon modifying the same into various forms.

EXAMPLES

Radial tires for use in passenger cars having basic patterns as illustrated in FIGS. 1 and 8 and having a tire size of 175/65R14 were manufactured on trial according to specifications of Tables 1 and 2. Wet performances, dry performances, on-snow performances, noise performances and cornering power (CP) of the respective sample tires were measured and compared.

<Wet Performance>

A vehicle (displacement of 2,000 cc; rim 6JJ; internal pressure 220 kPa) mounted with sample tires was made to enter a course provided with puddles having a depth of 5 mm and a length of 20 m on an asphalt road surface having a radius of 100 m while increasing its velocity stepwise. The lateral acceleration (lateral G) was measured for calculating an average lateral G of front wheels at velocities of 50 to 80 km/h (lateral-hydroplaning test). The results were indicated as indices with that of the Comparative Example 1 being defined as 100. The larger the value is, the more preferable it is.

Dry Performances

The above vehicle was employed for making test runs on a dry asphalt road surface of a tire test course, and properties related to steering wheel response, sense of rigidity, and grip etc. are indicated through sensory evaluations of the driver as indices with that of the Comparative Example 1 being defined as 100. The larger the value is, the more preferable it is.

<On-now Performances>

The above vehicle was employed for making test runs on a frozen snowy road surface of a tire test course, and properties related to steering wheel response, sense of rigidity, and grip etc. are indicated through sensory evaluations of the driver as indices with that of the Comparative Example 1 being defined as 100. The larger the value is, the more preferable it is.

<Noise Performance>

Noise when the above vehicle was employed for making a run on a dry asphalt road surface at a velocity of 50 km/h was measured by using a microphone disposed around the right ear side of the driver's seat and were indicated as indices with a reciprocal number of the noise db of the Comparative Example 1 (A) being defined as 100. The larger the value is, the more preferable it is.

<Cornering Power>

The cornering power was obtained from cornering force measured by using an indoor tester, and comparisons were made with indices with that of the Comparative Example 1 being defined as 100. The large the value is, the stronger the cornering power is, and the more it is superior in steering stability and turning performance.

TABLE 1

| | Pattern with three main grooves | Pattern with four main grooves |
|---|---|---|
| Tread grounding width TW | 118 mm | 115 mm |
| Groove width Wg1 of large width main groove | 9.0 mm [7.6%] | 12.0 mm [7.7%] |
| Groove depth | 7.4 mm [6.3%] | 7.8 mm [5.0%] |
| Distance A | 26.7 mm [22.6%] | 43.8 mm [28.2%] |
| Groove width Wg2a of first small width main groove | 4.0 mm [3.4%] | 5.8 mm [3.7%] |
| Groove depth | 7.4 mm | 7.8 mm |
| Distance B | 4.0 mm [3.4%] | 7.9 mm [5.1%] |
| Groove width Wg2b of second small width main groove | 5.4 mm [4.6%] | 5.8 mm [3.5%] |
| Groove depth | 7.4 mm | 7.8 mm [5.0%] |
| Distance C | 28.7 mm [24.3%] | 19.0 mm [12.3%] |
| Groove width Wg2c of third small width main groove | — | 7.2 mm [4.6%] |
| Groove depth | — | 7.8 mm [5.0%] |
| Distance D | — | 46.4 mm [30.0%] |
| Groove width Wg of narrow grooves | 1.0 mm [0.8%] | 1.2 mm [0.8%] |
| Groove depth | 3.5 mm | 3.5 mm |
| Rib width Lo of outer rib portion | 5.0 mm [4.2%] | 5.4 mm [3.5%] |
| Rib width Li of inner rib portion | 5.0 mm [4.2%] | 5.4 mm [3.5%] |
| Inclination angle θ1 of groove wall | 12° | 12° |
| Inclination angle θ2 of groove wall | 12° | 12° |

Numbers in [ ] indicate rates (%) with respect to the tread grounding width TW

TABLE 2

| | Comparative Example 1 | Comparative Example 2 | Example 1 | Example 2 | Example 3 | Example 4 | Example 5 | Example 6 | Example 7 |
|---|---|---|---|---|---|---|---|---|---|
| Number of main grooves | 3 | 3 | 3 | 3 | 3 | 3 | 3 | 4 | 4 |
| Tread pattern | FIG. 1 | FIG. 1 | FIG. 1 | FIG. 1 | FIG. 1 | FIG. 1 | FIG. 1 | FIG. 8 | FIG. 8 |
| One shoulder block region | | | | | | | | | |
| Front and rear rigidity STs | 100 | 80 | 80 | 80 | 90 | 105 | 90 | 90 | 90 |
| Lateral rigidity SYs | 100 | 100 | 110 | 110 | 100 | 100 | 110 | 100 | 100 |

TABLE 2-continued

|  | Comparative Example 1 | Comparative Example 2 | Example 1 | Example 2 | Example 3 | Example 4 | Example 5 | Example 6 | Example 7 |
|---|---|---|---|---|---|---|---|---|---|
| First crown block region | | | | | | | | | |
| Front and rear rigidity STc | 100 | 90 | 110 | 110 | 110 | 110 | 110 | 110 | 110 |
| Lateral rigidity SYc | 80 | 80 | 80 | 80 | 90 | 90 | 90 | 90 | 90 |
| Second crown block region | | | | | | | | | |
| Front and rear rigidity STc | 100 | 90 | 110 | 110 | 110 | 110 | 115 | 110 | 110 |
| Lateral rigidity SYc | 80 | 80 | 80 | 80 | 90 | 90 | 90 | 90 | 90 |
| Third crown block region | None | None | None | None | None | None | None | Present | Present |
| Front and rear rigidity STc | — | — | — | — | — | — | — | 100 | 100 |
| Lateral rigidity SYc | — | — | — | — | — | — | — | 90 | 80 |
| Other shoulder block region | | | | | | | | | |
| Front and rear rigidity STs | 100 | 80 | 80 | 80 | 90 | 105 | 85 | 90 | 90 |
| Lateral rigidity SYs | 100 | 100 | 110 | 110 | 100 | 100 | 110 | 100 | 100 |
| Front and rear rigidity ST of the entire grounding surface | 100 | 85 | 100 | 100 | 100 | 95 | 100 | 105 | 105 |
| Lateral rigidity SY of the entire grounding surface | 90 | 100 | 90 | 90 | 95 | 100 | 100 | 100 | 95 |
| Ratio of edge component lengths | | | | | | | | | |
| LEc1:LEc2:LEs3:LEs2 | 1:—:1:1 | 1:—:1:1 | 1:—:2:3 | 1:—:2:2 | 1:—:2:3 | 1:—:2:3 | 1:—:2:3 | 1:2:2:3 | 1:2:2:3 |
| Wet performances | 100 | 105 | 102 | 100 | 102 | 102 | 102 | 103 | 104 |
| Dry performances | 100 | 100 | 105 | 105 | 103 | 102 | 105 | 104 | 102 |
| On-snow performances | 100 | 105 | 105 | 100 | 105 | 105 | 105 | 102 | 102 |
| Noise performances | 100 | 98 | 100 | 100 | 100 | 100 | 100 | 102 | 102 |
| Cornering power | 100 | 95 | 105 | 105 | 103 | 100 | 103 | 105 | 103 |

*The front and rear rigidity STc, STs and the lateral rigidity SYc, SYs of the respective block regions are indicated as indices with a value for the front and rear rigidity STc, STs of the Comparative Example 1 being defined as 100.
*The front and rigidity ST and lateral rigidity SY of the entire grounding surface are indicated as indices with a value for the front and rear rigidity ST of the Comparative Example 1 being defined as 100.

As illustrated in the table, it can be confirmed that the tires of the present embodiments are capable of improving the dry performances and on-snow performances while securing superior wet performances and noise performances similar to those of the tire of the Comparative Example.

What is claimed is:

1. A pneumatic tire provided with four main grooves on a tread grounding surface that extend in a successive manner in a tire circumferential direction,
    wherein the main grooves are comprised of
    one large width main groove, the groove width thereof being in the range of 4 to 20% of a tread grounding width and the groove center thereof being spaced from a tire equator by a distance of 5 to 30% of the tread grounding width to one grounding end side in an tire axial direction, and
    small width grooves that are disposed between the large width main groove and the other grounding end and which groove width is larger than 2.0 mm but smaller than that of the large width main groove, and
    wherein both groove side edges of the large width main groove extend in a successive and linear manner in the tire circumferential direction without being interrupted by lateral grooves, sipings, slots or other notches,
    wherein a ratio ST/SY between an front and rear rigidity ST of the tread grounding surface in the tire circumferential direction on average of a single round of the tire and a lateral rigidity SY in the tire axial direction is set to be larger than 0.9 but smaller than 1.1,
    wherein the tread grounding surface is partitioned into
    a first shoulder block region between the large width main groove and the one grounding end,
    a first crown block region between the large width main groove and a first small width main groove that adjoins the large width main groove on the other grounding end side,
    a second circumferential rib region between the first small width main groove and a second small width main groove adjoining the first small width main groove on the other grounding end side,
    a third crown block region between the second small width main groove and a third small width main groove adjoining the second small width main groove on the other grounding end side, and
    a second shoulder block region between the third small width main groove and the other grounding end,
    wherein the lateral rigidity SYs is set to be larger than the front and rear rigidity STs for the first shoulder block region and the second shoulder block region, and
    the lateral rigidity SYc is set to be smaller than the front and rear rigidity STc for the second circumferential rib region,
    wherein the groove width of the third small width main groove is larger than the groove width of the first and second small width main grooves, and wherein each block regions and rib region comprise sipings, and an edge component lengths LE in a tire axial direction of all edges including edges of those sipings and edges of the blocks satisfy
$LEs2>LEc3 \geqq LEc2 \geqq LEc1$ wherein an edge component length of the second shoulder block region is defined as $LEs2$, an edge component length of the third crown block region as $LEs3$, an edge component length of the second circumferential rib region as $LEc2$, and an edge component length of the first crown block region as $LEs1$.

2. The pneumatic tire as claimed in claim 1, wherein an inner rib portion on a tire equator side that extends successively in a tire circumferential direction and an outer rib portion on the grounding end side are formed on both sides of the large width main groove, and wherein narrow grooves having a groove width of 0.4 to 2.0 mm are adjoining the inner and outer rib portions on sides opposite to the large width main groove.

3. The pneumatic tire as claimed in claim 1, wherein the edge component lengths LE satisfy
$LEs2>LEc3>LEc2>LEc1$.

4. The pneumatic tire as claimed in claim 1, wherein a groove center of the second small width main groove is apart from the tire equator towards the other grounding end side by a distance of 2 to 15% of the tread grounding width.

* * * * *